(12) United States Patent
Sun et al.

(10) Patent No.: US 11,137,533 B2
(45) Date of Patent: Oct. 5, 2021

(54) DISPLAY DEVICE AND SMART WATCH

(71) Applicants: Beijing BOE Optoelectronics Technology Co., Ltd., Beijing (CN); BOE Technology Group Co., Ltd., Beijing (CN)

(72) Inventors: Lingyu Sun, Beijing (CN); Liyu Fang, Beijing (CN); Fei Liang, Beijing (CN); Jingjun Du, Beijing (CN); Tingxiu Hou, Beijing (CN); Peng Zhong, Beijing (CN); Xiuyun Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 292 days.

(21) Appl. No.: 16/440,216

(22) Filed: Jun. 13, 2019

(65) Prior Publication Data
US 2020/0081172 A1    Mar. 12, 2020

(30) Foreign Application Priority Data
Sep. 10, 2018   (CN) .......................... 201811051931.9

(51) Int. Cl.
| | | |
|---|---|---|
| *F21V 8/00* | (2006.01) | |
| *G04B 19/16* | (2006.01) | |
| *G06F 1/16* | (2006.01) | |

(52) U.S. Cl.
CPC ............. *G02B 6/002* (2013.01); *G02B 6/005* (2013.01); *G02B 6/0088* (2013.01); *G04B 19/166* (2013.01); *G06F 1/163* (2013.01)

(58) Field of Classification Search
CPC ...... G02B 6/002; G02B 6/005; G02B 6/0088; G04B 19/166; G06F 1/163
See application file for complete search history.

(56) References Cited

U.S. PATENT DOCUMENTS

| | | | |
|---|---|---|---|
| 6,122,226 A | 9/2000 | Murakami et al. | |
| 8,319,653 B2 * | 11/2012 | Takebe .................. | B60K 37/02 340/691.6 |

(Continued)

FOREIGN PATENT DOCUMENTS

| | | |
|---|---|---|
| CN | 106461173 A | 2/2017 |
| CN | 106687772 A | 5/2017 |

(Continued)

OTHER PUBLICATIONS

Office Action for corresponding Chinese Application No. 201811051931.9 dated Nov. 4, 2020.

(Continued)

*Primary Examiner* — Matthew J. Peerce
(74) *Attorney, Agent, or Firm* — Arent Fox LLP; Michael Fainberg

(57) ABSTRACT

The disclosure discloses a display device and a smart watch. The display device includes a display panel, a backlight module and a center rotating shaft; the backlight module includes a light guide plate, an optical film, and a back plate; the backlight module has a first channel extending through the back plate, the light guide plate and the optical film sequentially to allow the center rotating shaft to pass through the backlight module; the display panel has a second channel extending through the display panel in a thickness direction thereof to allow the center rotating shaft to pass through the display panel; the second channel communicates with the first channel; the center rotating shaft passes through the first channel and the second channel sequentially, and a portion, between the display panel and the back plate, of the center rotating shaft is a light transmitting portion made of a transparent material.

18 Claims, 3 Drawing Sheets

(56) References Cited

U.S. PATENT DOCUMENTS

| | | | |
|---|---|---|---|
| 9,239,253 B2 * | 1/2016 | Hogg | G01D 13/02 |
| 9,664,541 B2 * | 5/2017 | Otani | G02B 5/0226 |
| 9,778,411 B2 * | 10/2017 | Yuki | B60K 35/00 |
| 2017/0059771 A1 | 3/2017 | Yuki et al. | |
| 2017/0153486 A1 | 6/2017 | Ahn et al. | |
| 2017/0253178 A1 | 9/2017 | Tane et al. | |
| 2018/0239078 A1 | 8/2018 | Yuki et al. | |

FOREIGN PATENT DOCUMENTS

| | | |
|---|---|---|
| CN | 206162009 U | 5/2017 |
| CN | 106990578 A | 7/2017 |
| CN | 107229148 A | 10/2017 |
| CN | 108027116 A | 5/2018 |
| CN | 207502869 U | 6/2018 |
| JP | 2000250050 A | 9/2000 |

OTHER PUBLICATIONS

Office Action for corresponding Chinese Application No. 201811051931.9 dated Jun. 9, 2021.

\* cited by examiner

DISPLAY DEVICE AND SMART WATCH

CROSS-REFERENCE TO RELATED APPLICATION

This Application claims priority to Chinese Patent Application No. 201811051931.9, filed on Sep. 10, 2018, the content of which is incorporated by reference in the entirety.

FIELD

This disclosure relates to the field of smart wearable devices, and particularly to a display device and a smart watch.

DESCRIPTION OF THE RELATED ART

Battery life problems of wearable products are the main focus of the current market. Where the power consumption of a display screen is a main factor, so that it is particularly important to reduce the power consumption of the display screen.

SUMMARY

Embodiments of the disclosure provide a display device and a smart watch.

In an aspect, the embodiments of the disclosure provide a display device, including: a display panel; a backlight module corresponding to the display panel; and a center rotating shaft; wherein the backlight module includes a light guide plate, an optical film on a light emitting side of the light guide plate, and a back plate on a side of the light guide plate facing away from the optical film; the backlight module is provided with a first channel extending through the back plate, the light guide plate and the optical film sequentially to allow the center rotating shaft to pass through the backlight module; the display panel is on a side of the optical film facing away from the light guide plate, and is provided with a second channel extending through the display panel in a thickness direction thereof to allow the center rotating shaft to pass through the display panel; wherein the second channel communicates with the first channel; and the center rotating shaft passes through the first channel and the second channel sequentially, and a portion, between the display panel and the back plate, of the center rotating shaft is a light transmitting portion made of a transparent material.

In some embodiments, the light transmitting portion of the center rotating shaft protrudes along a circumferential direction of the center rotating shaft to form a convex lens.

In some embodiments, the center rotating shaft includes a rotating shaft body and a reflecting component; the rotating shaft body is made of a transparent material, and a portion, between the back plate and the display panel, of the rotating shaft body forms the light transmitting portion; and the reflecting component covers a surface of the rotating shaft body, and has a gap in a portion corresponding to the light transmitting portion to expose the light transmitting portion.

In some embodiments, a material of the rotating shaft body includes a polycarbonate (PC) or a polymethyl methacrylate (PMMA).

In some embodiments, the backlight module further includes an inner side frame and an outer side frame; the inner side frame is arranged on the back plate surrounding the center rotating shaft, and the outer side frame is arranged outside the inner side frame along an outer side edge of the back plate in a sleeved manner; and a projection of the light guide plate on the back plate is between a projection of the inner side frame on the back plate and a projection of the outer side frame on the back plate.

In some embodiments, light reflecting netted dots are arranged on a surface of a side, facing the outer side frame, of the inner side frame.

In some embodiments, the backlight module further includes an inner side shading adhesive and an outer side shading adhesive; and the inner side shading adhesive covers a gap between the inner side frame and the optical film, and the outer side shading adhesive covers a gap between the outer side frame and the optical film.

In some embodiments, a side, facing away from the outer side shading adhesive, of the inner side shading adhesive extends to the center rotating shaft and comes into contact with the center rotating shaft.

In some embodiments, a surface of a side, in contact with the rotating shaft body, of the inner side shading adhesive is arranged with a lubricating layer.

In some embodiments, the inner side shading adhesive and the outer side shading adhesive are both black and white adhesives; and black surfaces of the black and white adhesives face the display panel.

In another aspect, the embodiments of the disclosure further provide a smart watch, including a dial plate, a watch hand and the display device according to the embodiments of the disclosure, wherein: the display device is in the dial plate, and an end of the watch hand is sleeved on the center rotating shaft.

In some embodiments, the light transmitting portion of the center rotating shaft protrudes along a circumferential direction of the center rotating shaft to form a convex lens.

In some embodiments, the center rotating shaft includes a rotating shaft body and a reflecting component; the rotating shaft body is made of a transparent material, and a portion, between the back plate and the display panel, of the rotating shaft body forms the light transmitting portion; and the reflecting component covers a surface of the rotating shaft body, and has a gap in a portion corresponding to the light transmitting portion to expose the light transmitting portion.

In some embodiments, a material of the rotating shaft body includes a polycarbonate (PC) or a polymethyl methacrylate (PMMA).

In some embodiments, the backlight module further includes an inner side frame and an outer side frame; the inner side frame is arranged on the back plate surrounding the center rotating shaft, and the outer side frame is arranged outside the inner side frame along an outer side edge of the back plate in a sleeved manner; and a projection of the light guide plate on the back plate is between a projection of the inner side frame on the back plate and a projection of the outer side frame on the back plate.

In some embodiments, light reflecting netted dots are arranged on a surface of a side, facing the outer side frame, of the inner side frame.

In some embodiments, the backlight module further includes an inner side shading adhesive and an outer side shading adhesive; and the inner side shading adhesive covers a gap between the inner side frame and the optical film, and the outer side shading adhesive covers a gap between the outer side frame and the optical film.

In some embodiments, a side, facing away from the outer side shading adhesive, of the inner side shading adhesive extends to the center rotating shaft and comes into contact with the center rotating shaft.

In some embodiments, a surface of a side, in contact with the rotating shaft body, of the inner side shading adhesive is arranged with a lubricating layer.

In some embodiments, the inner side shading adhesive and the outer side shading adhesive are both black and white adhesives; and black surfaces of the black and white adhesives face the display panel.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

In the related art, a smart watch is generally provided with a hole in a center of a module, and adopts mechanical hands to display time, which can significantly reduce the display time of a liquid crystal display screen, thereby reducing the power consumption of the liquid crystal display screen.

However, as a backlight module of the smart watch adopting the mechanical hands has a center rotating shaft, a light source disposed on a side of the smart watch will form a dark region on a side, facing away from the light source, of the center rotating shaft, which severely affects a display effect of the module.

Figure 1:
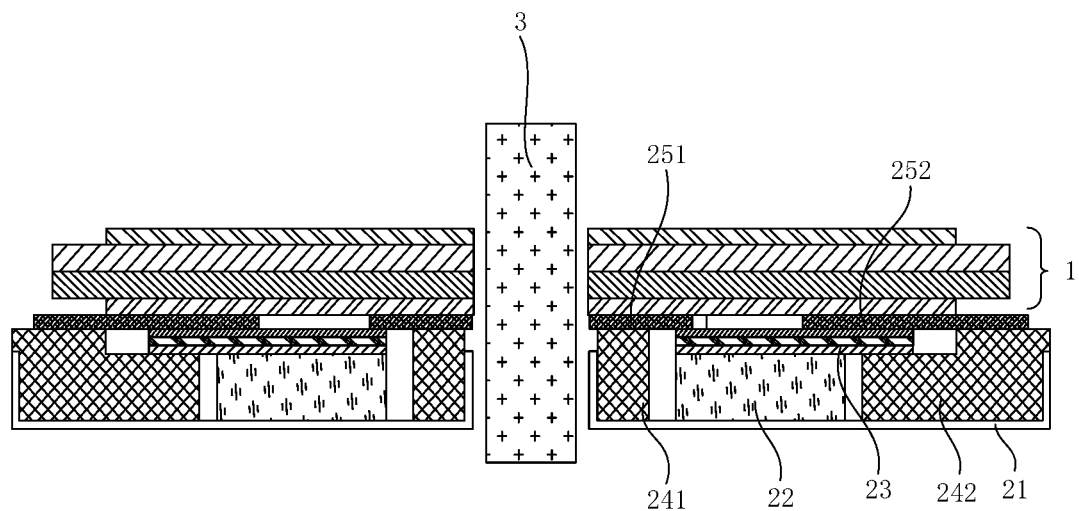
FIG. 1 is a schematic diagram of a dark region formed on a display panel of a display device in the related art.
Figure 2:
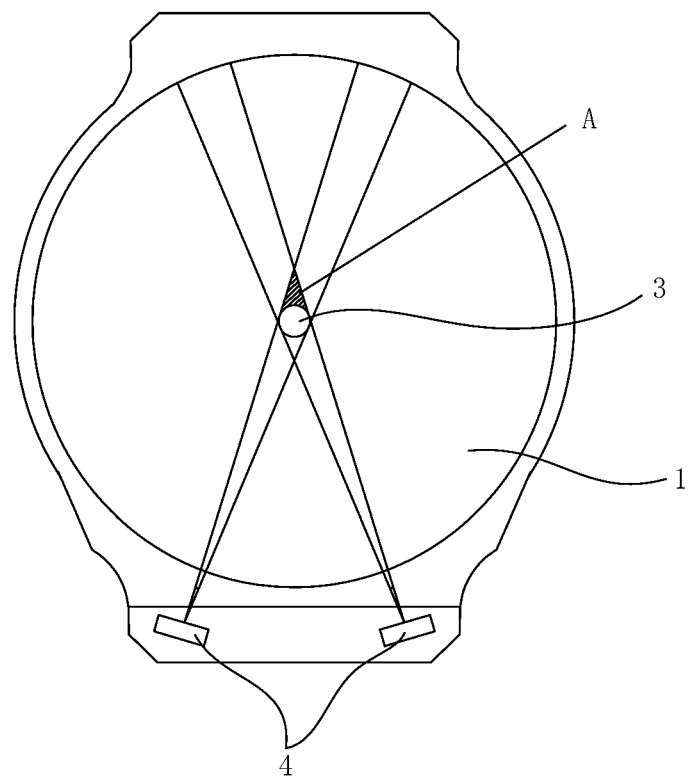
FIG. 2 is a schematic structural diagram of a display device in the related art.

For example, as illustrated in FIG. 1 and FIG. 2, in a display device applicable to a mechanical hand type smart watch, FIG. 1 illustrates a structural diagram of a section, parallel to an axial direction of a center rotating shaft, of the display device; where the center rotating shaft 3 passes through a display panel 1 and a back plate 21, and is located in a light transmitting path. Under the irradiation of light sources as illustrated in FIG. 2, light rays emitted by the light source(s) 4 are blocked by the center rotating shaft 3 when transmitted between the display panel 1 and the back plate 21 and may not be transmitted to a light guide plate 22 located on a side, facing away from the light source(s) 4, of the center rotating shaft, and then the display panel 1 has a dark region A formed on the side, facing away from the light source(s) 4, of the center rotating shaft 3 and may not achieve a good display effect.

In view of the above, the embodiments of the disclosure provide a display device and a smart watch to eliminate a dark region formed on a side, facing away from a center rotating shaft, of a mechanical hand type smart watch in the related art, so as to achieve a better display effect thereof.

The technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

Figure 3:
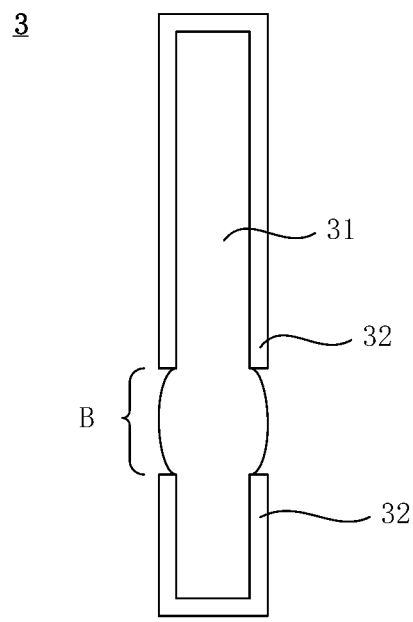
FIG. 3 is a schematic structural diagram of a center rotating shaft of a display device according to the embodiments of the disclosure.
Figure 4:
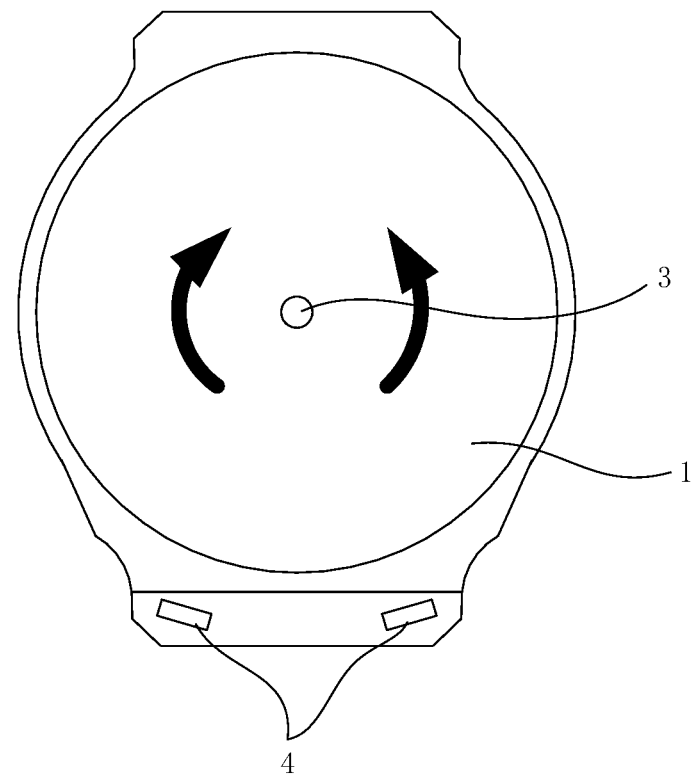
FIG. 4 is a schematic diagram of a light path reflected by netted dots of an inner side frame of a display device according to the embodiments of the disclosure.
Figure 5:
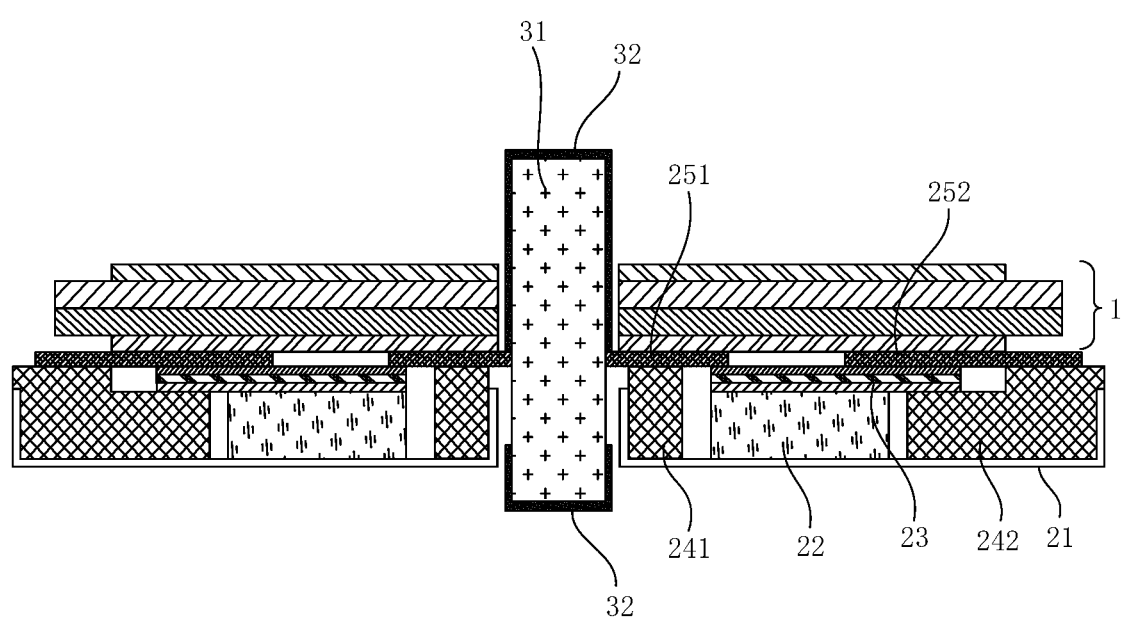
FIG. 5 is a schematic structural diagram of a display device according to the embodiments of the disclosure.

As illustrated in FIG. 3 to FIG. 5, the embodiments of the disclosure provide a display device, including: a display panel 1, a backlight module and a center rotating shaft 3; where the display panel 1 and the backlight module are arranged correspondingly; the backlight module includes a light guide plate 22, an optical film 23 on a light emitting side of the light guide plate 22, and a back plate 21 on a side of the light guide plate 22 facing away from the optical film 23. The backlight module is provided with a first channel extending through the back plate 21, the light guide plate 22 and the optical film 23 sequentially to allow the center rotating shaft 3 to pass through the backlight module. The display panel 1 is arranged on a side of the optical film 23 facing away from the light guide plate 22, and is provided with a second channel extending through the display panel in a thickness direction thereof to allow the center rotating shaft 3 to pass through the display panel 1; where the second channel communicates with the first channel, the center rotating shaft 3 passes through the first channel and the second channel sequentially, and a portion, between the display panel 1 and the back plate 21, of the center rotating shaft 3 is a light transmitting portion made of a transparent material.

In the display device according to the embodiments of the disclosure, the display panel 1 is arranged correspondingly on the backlight module, thus light rays emitted by the backlight module can be emitted through the display panel 1 to achieve a display effect. Further, when the display panel 1 is installed with the backlight module, the first channel will communicate with the second channel to allow the center rotating shaft 3 to pass through the display panel 1 and the backlight module along a direction perpendicular to the display panel 1 and the backlight module; where the center rotating shaft 3 is configured to install hands of a smart watch when the display device is applied to a mechanical hand type smart watch.

Further, the light guide plate 22 and the optical film 23 are arranged in a stacked manner on a side of the back plate 21 facing the display panel 1, sequentially. Generally, light rays emitted by the light source(s) 4 located at an edge of a side of the back plate 21 are emitted from the display panel 1 through the light guide plate 22 and the optical film 23 to achieve the display effect.

In the display device according to the embodiments of the disclosure, as illustrated in FIG. 3 and FIG. 5, the portion, between the display panel 1 and the back plate 21, of the center rotating shaft 3 forms the light transmitting portion B, so that the light rays emitted by the light source(s) 4 may pass through the light transmitting portion and reach the light guide plate 22 opposite to the light source(s) 4, instead of being blocked by the center rotating shaft 3 and forming the display dark region.

According to the above display device, the portion, between the back plate 21 and the display panel 1, of the center rotating shaft 3 is the light transmitting portion made of the transparent material; and when the light source(s) 4 located on a side of an edge of the backlight module emit the light rays, the presence of the center rotating shaft 3 passing through the first channel and the second channel does not affect the transmission of the light rays, and the light rays can pass through the light transmitting portion to reach the light guide plate 22 in a region opposite to the light source(s) 4 and then are emitted from the display panel 1 after being refracted by the light guide plate 22, so that no dark region will be formed on the display panel 1 on a side, facing away from the light source(s) 4, of the center rotating shaft 3, and the entire display device can achieve a better display effect.

It shall be noted that, in order to reduce the influence of light absorption of the back plate 21 on the display effect, the back plate 21 in the embodiments of the disclosure shall adopt a relatively thin structure.

In some embodiments, as illustrated in FIG. 3, the light transmitting portion of the center rotating shaft 3 protrudes along a circumferential direction of the center rotating shaft to form a convex lens. The convex lens has an effect of focusing light and thus can further improve the effect of light passing through the light transmitting portion of the center rotating shaft 3.

It shall be noted that, the protruding shape of the light transmitting portion of the center rotating shaft 3 is not limited in the embodiments of the disclosure as long as a structure similar to a convex lens can be formed.

In some embodiments, the center rotating shaft 3 includes a rotating shaft body 31 and a reflecting component 32; where the rotating shaft body 31 is made of a transparent material, and a portion, between the back plate 21 and the display panel 1, of the rotating shaft body 31 forms a light transmitting portion; the reflecting component 32 covers a surface of the rotating shaft body 31, and has a gap in a portion corresponding to the light transmitting portion so as to expose the light transmitting portion.

In the display device according to the embodiments of the disclosure, the portion, between the display panel 1 and the back plate 21, of the rotating shaft body 31 forms the light transmitting portion; and other portion than the light transmitting portion of the rotating shaft body 31 shall be lightproof, so as to ensure that the light rays cannot be emitted through the rotating shaft to affect the display effect. In some embodiments, the rotating shaft body 31 in the present embodiment is made of a transparent material, so that the reflecting component 32 covers the surface of the lightproof portion of the rotating shaft body 31 in order to achieve a lightproof effect of the lightproof portion. Equivalently, the reflecting component 32 covers the surface of the rotating shaft body 31, and a gap capable of exposing the light transmitting portion is formed in a position corresponding to a region where the light transmitting portion is.

In some embodiments, the reflecting component 32 can have various implementation modes. For example, the reflecting component 32 is a reflection sheet adhered to the surface of the rotating shaft body 31, or the reflecting component 32 is a reflection layer coated on the surface of the rotating shaft body 31.

In some embodiments, a material of the rotating shaft body 31 in the embodiments of the disclosure includes a polycarbonate (PC) or a polymethyl methacrylate (PMMA), as the two materials are relatively high in transparency; where a model of the PC can be HL4000, etc.

It shall be noted that, in the embodiments of the disclosure, the rotating shaft body 31 extends through the back plate 21 and the display panel 1, a portion of the rotating shaft body 31 located between the back plate 21 and the display panel 1 forms the above light transmitting portion; and a portion of the rotating shaft body 31 located at an end of the light transmitting portion facing away from the back plate 21, and a portion of the rotating shaft body 31 located at an end of the light transmitting portion facing away from the display panel 1, are covered by the reflecting component 32.

In some embodiments, as illustrated in FIG. 5, the backlight module further includes an inner side frame 241 and an outer side frame 242; the inner side frame 241 is arranged on the back plate 21 surrounding the center rotating shaft 3, the outer side frame 242 is arranged outside the inner side frame 241 along an outer edge of the back plate 21 in a sleeved manner; and the light guide plate 22 is arranged on the back plate 21 between the inner side frame 241 and the outer side frame 242.

In the embodiments of the disclosure, the inner side frame 241 and the outer side frame 242 are both of annular structures; where the inner side frame 241 is arranged on an inner ring side, proximate to the first channel, of the light guide plate 22; and a projection of the light guide plate 22 on the back plate 21 is located between a projection of the inner side frame 241 on the back plate 21 and a projection of the outer side frame 242 on the back plate 21.

In some embodiments, in order to further enhance a light transmitting effect, light reflecting netted dots are arranged on a surface of a side, facing the outer side frame 242, of the inner side frame 241. The light rays irradiating the surface of the inner side frame 241 are reflected for multiple times to form a transmitting path in a direction indicated by the arrows as illustrated in FIG. 4, thereby further alleviating the problem of the dark region in the related art. Where the side, facing the outer side frame 242, of the inner side frame 241 refers to a side in a direction from the center rotating shaft 3 to an edge of the back plate 21.

In some embodiments, the inner side frame 241 is made of a transparent material such as the PC or the PMMA, which will not be limited herein.

In some embodiments, the backlight module further includes an inner side shading adhesive 251 and an outer side shading adhesive 252; the inner side shading adhesive 251 covers a gap between the inner side frame 241 and the optical film 23, and the outer side shading adhesive 252 covers a gap between the outer side frame 242 and the optical film 23.

As illustrated in FIG. 5, an outer side gap exists between the outer side frame 242 and the optical film 23, and the outer side shading adhesive 252 can prevent the light rays from leaking from the outer side gap. Where the outer side shading adhesive 252 is in an annular shape, and an edge of an inner ring of the outer side shading adhesive 252 is located on the optical film 23, and an edge of an outer ring of the outer side shading adhesive 252 is located on the outer side frame 242.

Similarly, as illustrated in FIG. 2, an inner side gap exists between the inner side frame 241 and the optical film 23 (equivalent to being between the inner side frame 241 and the light guide plate 22), and the inner side shading adhesive 251 can prevent the light rays from leaking from the inner side gap. Where the inner side shading adhesive 251 is also in an annular shape, an edge of an inner ring of the inner side shading adhesive 251 is located on the inner side frame 241, and an edge of an outer ring of the inner side shading adhesive 251 is located on the optical film 23.

In some embodiments, in order to further prevent the light rays from leaking, a side (namely the edge of the inner ring of the inner side shading adhesive 251), proximate to the center rotating shaft 3, of the inner side shading adhesive 251 extends to the center rotating shaft 3 and comes into contact with the rotating shaft body 3 of the center rotating shaft 3.

During the using process, the center rotating shaft 3 in the embodiments of the disclosure can rotate around an axis of the center rotating shaft 3 relative to the whole backlight module, and relative movement between the rotating shaft body 31 and a side, facing away from the outer side shading adhesive 252, of the inner side shading adhesive 251 will happen. Thus, in order to prevent damage to the rotating shaft body 31 and/or the inner side shading adhesive 251 due to relatively large friction between the rotating shaft body 31 and the inner side shading adhesive 251, a lubricating layer is arranged on a surface of a side, in contact with the rotating shaft body 31, of the inner side shading adhesive 251, so as to reduce the friction generated between the rotating shaft body 31 and the inner side shading adhesive 251 in the relative movement.

In some embodiments, the inner side shading adhesive 251 and the outer side shading adhesive 252 are both black and white adhesives, and black surfaces of the black and white adhesives face the display panel 1.

Based upon a same inventive concept, the embodiments of the disclosure further provide a smart watch. The smart watch includes a dial plate, a watch hand, and the display device above according to the embodiments of the disclosure; where the display device is arranged in the dial plate, an end of the watch hand is sleeved on the center rotating shaft 3, and the watch hand can rotate around the center rotating shaft 3 in an operating process. Further, it shall be noted that, the smart watch can achieve all the beneficial effects that are achieved by the display device, which thus will not be repeated herein.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. A display device, comprising:
   a display panel;
   a backlight module corresponding to the display panel; and
   a center rotating shaft;
   wherein the backlight module comprises a light guide plate, an optical film on a light emitting side of the light guide plate, and a back plate on a side of the light guide plate facing away from the optical film; the backlight module is provided with a first channel extending through the back plate, the light guide plate and the optical film sequentially to allow the center rotating shaft to pass through the backlight module;
   the display panel is on a side of the optical film facing away from the light guide plate, and is provided with a second channel extending through the display panel in a thickness direction thereof to allow the center rotating shaft to pass through the display panel; wherein the second channel communicates with the first channel;
   the center rotating shaft passes through the first channel and the second channel sequentially, and a portion, between the display panel and the back plate, of the center rotating shaft is a light transmitting portion made of a transparent material;
   wherein the light transmitting portion of the center rotating shaft protrudes along a circumferential direction of the center rotating shaft to form a convex lens; and
   wherein the light transmitting portion is located in a light transmitting path of the light guide plate.

2. The display device according to claim 1, wherein the center rotating shaft comprises a rotating shaft body and a reflecting component;
   the rotating shaft body is made of a transparent material, and a portion, between the back plate and the display panel, of the rotating shaft body forms the light transmitting portion; and
   the reflecting component covers a surface of the rotating shaft body, and has a gap in a portion corresponding to the light transmitting portion to expose the light transmitting portion.

3. The display device according to claim 2, wherein a material of the rotating shaft body comprises a polycarbonate (PC) or a polymethyl methacrylate (PMMA).

4. The display device according to claim 1, wherein the backlight module further comprises an inner side frame and an outer side frame;
   the inner side frame is arranged on the back plate surrounding the center rotating shaft, and the outer side frame is arranged outside the inner side frame along an outer side edge of the back plate in a sleeved manner; and
   a projection of the light guide plate on the back plate is between a projection of the inner side frame on the back plate and a projection of the outer side frame on the back plate.

5. The display device according to claim 4, wherein light reflecting netted dots are arranged on a surface of a side, facing the outer side frame, of the inner side frame.

6. The display device according to claim 4, wherein the backlight module further comprises an inner side shading adhesive and an outer side shading adhesive; and
   the inner side shading adhesive covers a gap between the inner side frame and the optical film, and the outer side shading adhesive covers a gap between the outer side frame and the optical film.

7. The display device according to claim 6, wherein a side, facing away from the outer side shading adhesive, of the inner side shading adhesive extends to the center rotating shaft and comes into contact with the center rotating shaft.

8. The display device according to claim 7, wherein a surface of a side, in contact with the rotating shaft body, of the inner side shading adhesive is arranged with a lubricating layer.

9. The display device according to claim 6, wherein the inner side shading adhesive and the outer side shading adhesive are both black and white adhesives; and black surfaces of the black and white adhesives face the display panel.

10. A smart watch, comprising a dial plate, a watch hand and the display device according to claim 1, wherein:
    the display device is in the dial plate, and an end of the watch hand is sleeved on the center rotating shaft.

11. The smart watch according to claim 10, wherein the center rotating shaft comprises a rotating shaft body and a reflecting component;
    the rotating shaft body is made of a transparent material, and a portion, between the back plate and the display panel, of the rotating shaft body forms the light transmitting portion; and the reflecting component covers a surface of the rotating shaft body, and has a gap in a portion corresponding to the light transmitting portion to expose the light transmitting portion.

12. The smart watch according to claim 11, wherein a material of the rotating shaft body comprises a polycarbonate (PC) or a polymethyl methacrylate (PMMA).

13. The smart watch according to claim 10, wherein the backlight module further comprises an inner side frame and an outer side frame;
the inner side frame is arranged on the back plate surrounding the center rotating shaft, and the outer side frame is arranged outside the inner side frame along an outer side edge of the back plate in a sleeved manner; and
a projection of the light guide plate on the back plate is between a projection of the inner side frame on the back plate and a projection of the outer side frame on the back plate.

14. The smart watch according to claim 13, wherein light reflecting netted dots are arranged on a surface of a side, facing the outer side frame, of the inner side frame.

15. The smart watch according to claim 13, wherein the backlight module further comprises an inner side shading adhesive and an outer side shading adhesive; and
the inner side shading adhesive covers a gap between the inner side frame and the optical film, and the outer side shading adhesive covers a gap between the outer side frame and the optical film.

16. The smart watch according to claim 15, wherein a side, facing away from the outer side shading adhesive, of the inner side shading adhesive extends to the center rotating shaft and comes into contact with the center rotating shaft.

17. The smart watch according to claim 16, wherein a surface of a side, in contact with the rotating shaft body, of the inner side shading adhesive is arranged with a lubricating layer.

18. The smart watch according to claim 15, wherein the inner side shading adhesive and the outer side shading adhesive are both black and white adhesives; and black surfaces of the black and white adhesives face the display panel.

* * * * *